March 30, 1965  W. A. MINIX  3,175,297
AIR GAUGE HEAD
Filed Oct. 30, 1963
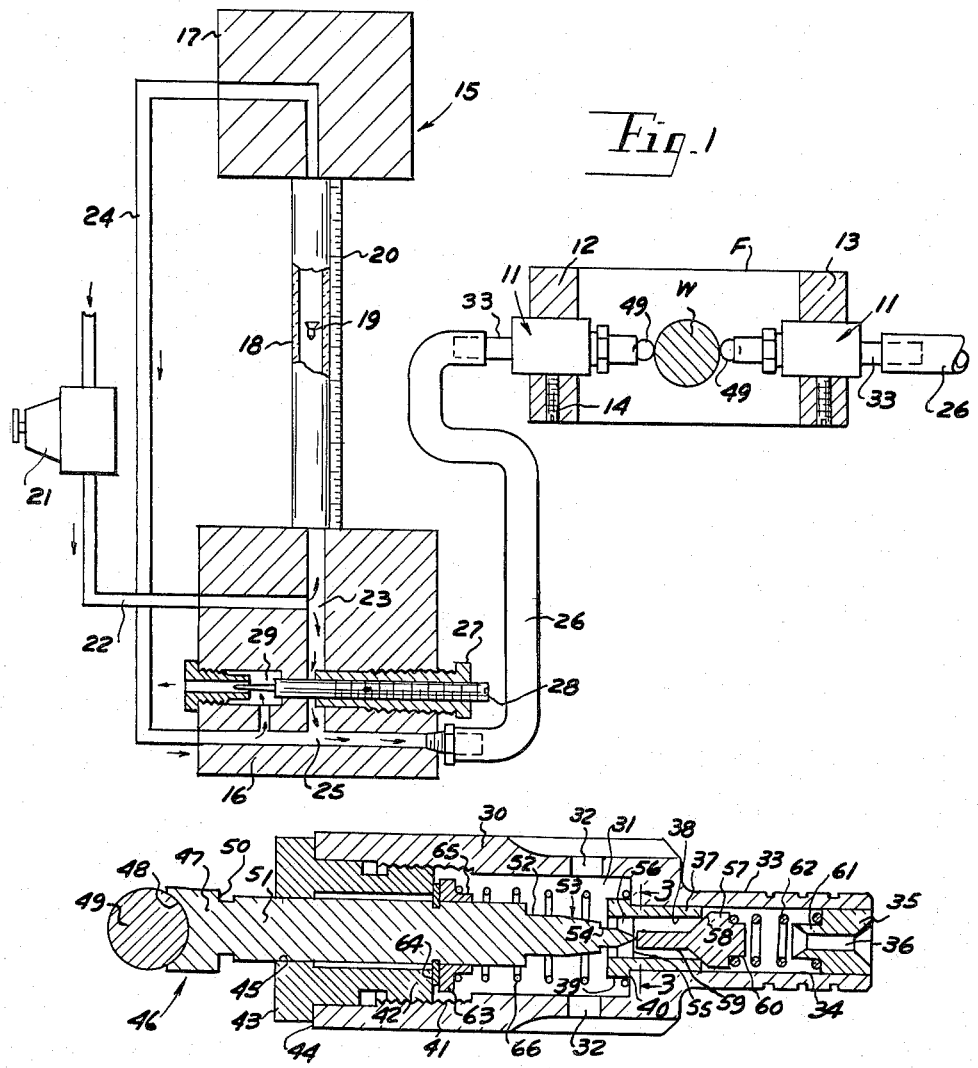
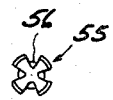
INVENTOR.
WILLIAM A. MINIX
BY
Cullen, Sloman & Cantor
ATTORNEYS

United States Patent Office 3,175,297
Patented Mar. 30, 1965

3,175,297
AIR GAUGE HEAD
William A. Minix, Detroit, Mich., assignor to Freeland Gauge Company, Detroit, Mich.
Filed Oct. 30, 1963, Ser. No. 320,058
4 Claims. (Cl. 33—172)

The present invention relates to an air gauge for controlling air bleeding in a pneumatic measuring circuit.

This invention is an improvement over the air gauge head disclosed in my co-pending patent application, Serial No. 294,024, filed July 10, 1963, now Patent No. 3,147,-615, dated September 8, 1964.

Heretofore, various types of air gauge heads have been employed in circuits of this nature for the purpose of responding to the surface of a work piece for checking the dimensions thereof and wherein the deflection of the gauge element in responding to the surface of the work piece permits the bleeding of air through the gauge head in turn effecting the flow of air in a measuring circuit to give invisible indication as to whether the work piece meets or does not meet a predetermined standard dimension within a predetermined range.

One of the difficulties in air gauges of this type has been the excessive wastage of air through the gauge body when the gauge head is not in use. It is therefore an object of this invention to provide an automatic shut-off valve for the gauge head so that air does not flow through the body when the gauge is not in use. In the present construction air is employed only when the gauge head is being used.

This and other objects will be seen from the following specification and claims in conjunction with the appended drawing in which:

FIG. 1 is a partly sectioned schematic view illustrating the present air gauge head as mounted in a fixture and used in conjunction with a pneumatic measuring air flow circuit.

FIG. 2 is a longitudinal section of the air gauge head on an increased scale.

FIG. 3 is a fragmentary section taken in the direction of arrows 3—3 of FIG. 2.

It will be understood that the above drawing illustrates merely a preferred embodiment of the invention, and that other embodiments are contemplated within the scope of the claims hereafter set forth.

*Pneumatic measuring circuit*

The present air gauge is employed in connection with a pneumatic air flow measuring circuit. In FIG. 1, a pair of the present air gauge heads 11 are mounted within blocks 12 and 13 of fixture F and secured at 14 in diametrically opposed relation, and between which work piece W is projected for gauging purposes.

The pneumatic measuring circuit includes an air flow gauge assembly generally indicated at 15 including valve body 16, tube support 17 with glass flow tube 18 interposed, within which float 19 is movably positioned depending upon the rate of flow of air therethrough. A suitable indicating scale 20 is provided.

Air from a suitable source is directed through pressure regulator 21 for delivering air under pressure such as at ten to twelve pounds per square inch through conduit 22 to intake chamber 23 of the valve body. The air passes upwardly through tube 18, through support 17 and conduit 24 returning to delivery chamber 25 in the valve body, and thence through flexible plastic or other conduit 26 connected over inlet 33, FIG. 2, of one of the gauging heads 11, FIG. 1.

Associated with intake chamber 23 is a by-pass valve 27 adjustably mounted within valve body 16 for the purpose of by-passing some of the air from the intake chamber directly to delivery chamber 25 rather than through glass tube 18. This is for the purpose of regulating the magnification factor of the air measuring system.

There is also provided concentrically with the by-pass valve an air bleed valve 28 which controls the release of some of the air within delivery chamber 25 through passage 29 directly to atmosphere. This is an air bleed for adjusting float 19 within tube 18 under certain conditions and with a predetermined initial delivery pressure from regulator 21.

The detail of the construction and operation of said pneumatic measuring air flow circuit is more fully disclosed in my presently co-pending patent application executed June 7, 1963, Serial No. 290,526, filed June 25, 1963.

*Air gauge head*

The present invention is particularly directed to the construction of the air gauge head 11, which is shown in fixture F for gauging purposes in FIG. 1, one of said gauge heads being indicated in detail in FIG. 2.

Air gauge head 11 includes elongated body 30 having axial bore 31 and a series of transverse communicating air outlets 32, and at one end the elongated air inlet 33 with axial bore.

Within the outer end of said inlet there is an economizer orifice, preferably constructed of brass, including body 35 snugly pressed within bore 34. Body 35 has an axial passage 36 by which air from tube 26 is directed into inlet 33. Within the inner end of said inlet and adjacent bore 31 there is press fitted an air intake bearing 37 having a bore 38 and the enlarged annular head 39 in registry with shoulder 40 adjacent bore 31.

*Bearing nut*

Hollow open ended bearing nut 43 has a tubular shank 42 threaded into threaded portion 41 of bore 31 at one end of body 11 and in engagement therewith at 44, FIG. 2. The head of nut 44 has an axial bore 45 which communicates with bore 31.

*Stem*

The control mechanism of the present gauge head is an elongated axial stem 46 which includes the head 47 having a hemispherical recess 48 in its outer end. Within said recess is nested and fixedly secured the preferably carbide ball 49, also shown in FIG. 1, adapted for operative engagement with work piece W whose dimension is to be gauged.

Head 47 terminates in shoulder 50 which serves as a positive stop limiting inward movement of the stem with respect to the gauge body. The shoulder merges with the shank portion 51 of cylindrical shape which is slidably and guidably positioned within bore 45 of nut 44.

The stem intermediate its ends includes a cylindrical portion 52 of reduced diameter within bore 31 which is arranged axially of air inlet bearing 37 and merges with the forwardly and outwardly tapered flow control valve element 53. The latter terminates in the reduced diameter shank 54 carrying the circular end supporting flange 55.

Flange 55 provides the supporting means for the inner end of stem 46 since said flange slidably engages the bore of air inlet bearing 37, FIG. 2.

Flow control valve 53 is adapted for cooperative registry variably with the leading edge of bearing 37 and its corresponding bore for regulating the flow of air therethrough. This flow varies depending upon the extent of axial inward movement of the stem as controlled by carbide ball 49 in engaging work piece W, FIG. 1, whose dimension is to be gauged.

Flange 55, FIG. 3, has a series of elongated and tapered radial flutes or grooves 56 therein providing air passages for permitting the flow of air through air inlet bearing 37 and past flange 55 for communication with bore 31 and outlets 32.

Automatic shut-off valve

The present gauge includes therein an automatic shut-off valve by which when the gauge head is not in use air will not flow therethrough and be wasted. For this purpose there is provided a cylindrical valve body 57 which is loosely and axially positioned within air inlet 33. Body 57 includes the tapered valve element 58 which projects into the inlet end of bearing 37 and is in seated engagement therewith, FIG. 2, when the stem is in inoperative position out of contact with work W.

The tapered valve element 58 terminates in the axially extending stem 59 which at its outer end engages flange 55 of stem 46 and is responsive to inward movements of said stem relative to the body.

Valve body 57 at its opposite end has a shank 60 of reduced diameter which cooperatively receives one end of compression spring 62. Its opposite end extends around axial shank 61 of the economizer body 35, FIG. 2.

By this construction the automatic air shut-off control valve is at all times biased inwardly so that its valve element 58 seats against air inlet bearing 37.

Collar 63 is loosely mounted over stem portion 51 and is anchored against movement in one direction by lock ring 64 connected to the stem. The ring in turn is in operative engagement with the inner end of bearing nut 43 when contactor 49 is out of engagement with workpiece W. Ring 64 limits outward movement of the stem relative to the body. Coiled spring 66 is loosely positioned within bore 31 around stem 46 and extends over the reduced shank 65 of collar 63, and at its opposite end engages shoulder 40 within the body at one end of bore 31. By this construction, therefore, and under the action of spring 66 stem 46 is at all times urged to the outermost position shown in FIG. 2.

Operation

In normal operation as set up within fixture F of FIG. 1, work piece W is introduced between a pair of said gauge heads and will effect axial inward movements of the respective stems 46. As viewed in FIG. 2, until there has been a limited axial inward movement of stem 46, no flow of air passes from inlet chamber 34 past shut-off valve 57-58 into air inlet bearing 37 for passage into bore 31 and through outlets 32.

After a limited inward movement of said stem, valve 57 is unseated against the action of its biasing spring 62 due to the engagement of stem 46 with shank 59 forming a part of valve 57. This initiates the flow of air through inlet 33. The present control mechanism includes the forwardly and outwardly tapered flow control valve element 53 which as it is partly projected into the outlet end of bearing 37 begins to close off some of the flow of air therethrough. In an extreme inward positioning of the valve control element 53 relative to the air inlet bearing, flow through said bearing would be completely cut-off, this occurs when the cylindrical portion 52 of said stem engages bearing 37.

In operation there is normally an intermediate positioning of valve element 53 with respect to the inner end portion of air inlet bearing 37. This controls variably the amount of air which passes into bore 31 and thence to the atmosphere depending upon variations in the surface of the work piece W being gauged.

Having described my invention, reference should now be had to the following claims:

I claim:

1. In an air gauge for controlling air bleeding in a pneumatic measuring circuit;

the improvement comprising an elongated body having a bore, radial air outlets communicating with the bore and an elongated air inlet;

a cylindrical air intake bearing in said inlet communicating with said bore;

a hollow open ended bearing nut projected into said bore at and engaging one end of the body;

a work piece engaging stem axially mounted within the body and adjacent its respective ends guidably, slidably and axially journaled respectively in said intake bearing and said bearing nut;

an axially movable normally closed automatic air shut-off valve including a valve body axially and loosely positioned within said air inlet, an annular tapered valve element on said body axially projected into and in engagement with one end of said air intake bearing closing off air flow therethrough and an elongated shank axially extending from said valve element and at its one end in engagement with said stem adapted for movement therewith;

a coiled spring anchored within said air inlet and bearing against said valve body, said valve adapted for unseating movement outwardly of said air inlet bearing upon inward movement of said stem relative to said body permitting flow of air from said air inlet and through said bearing and into said bore; and an annular outwardly and forwardly tapered flow control valve element on said stem adjacent one end movable into said intake bearing for variably regulating the rate of air flow therethrough.

2. In the air gauge defined in claim 1, the mounting of said stem within said air inlet bearing including a cylindrical flange on the inner end of said stem slidable within said air inlet bearing and including a series of radial fluted openings therein defining air passages.

3. In the air gauge assembly defined in claim 1, a locking ring upon said stem within said bore engageable with the bearing nut on movement of the stem in one direction to prevent axial disassembly of the stem from the body;

a collar on said stem anchored against said ring;

and a coiled spring interposed between said collar and said body at one end of said bore normally urging said stem to an outermost position relative to said body and permitting said automatic shut-off air control valve to seat relative to said air inlet bearing.

4. In the air gauge defined in claim 1, an air economizer within the bore of said air inlet at its outer end and including a bore of reduced diameter relative to the bore of said air inlet;

the anchoring of the automatic shut-off valve spring being said air economizer, said spring being interposed between said economizer and said air inlet shut-off valve.

No references cited.

ISAAC LISANN, *Primary Examiner.*